Dec. 15, 1959  O. HEIGL ET AL  2,916,854
METHOD OF CULTIVATING PLANTS BY USE OF PERFORATED PLASTIC FOIL
Filed Aug. 27, 1957  3 Sheets-Sheet 2
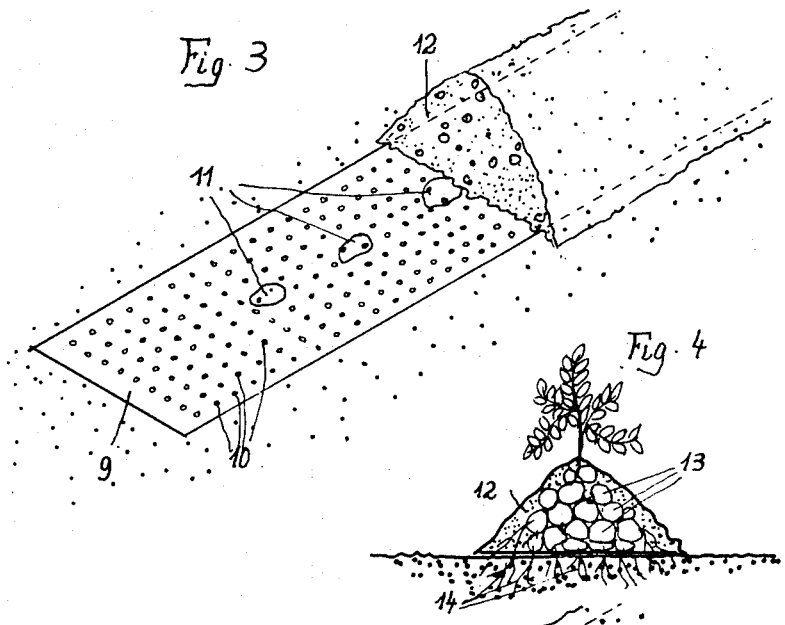
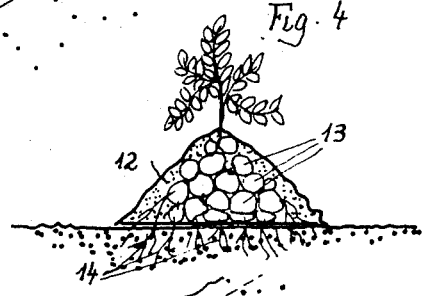
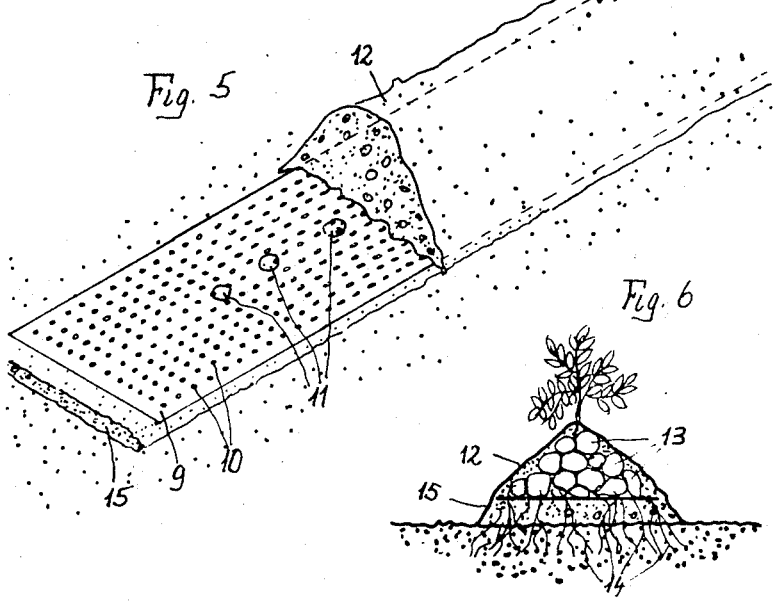
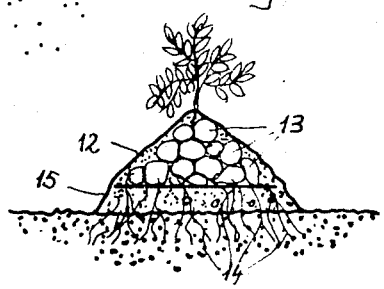

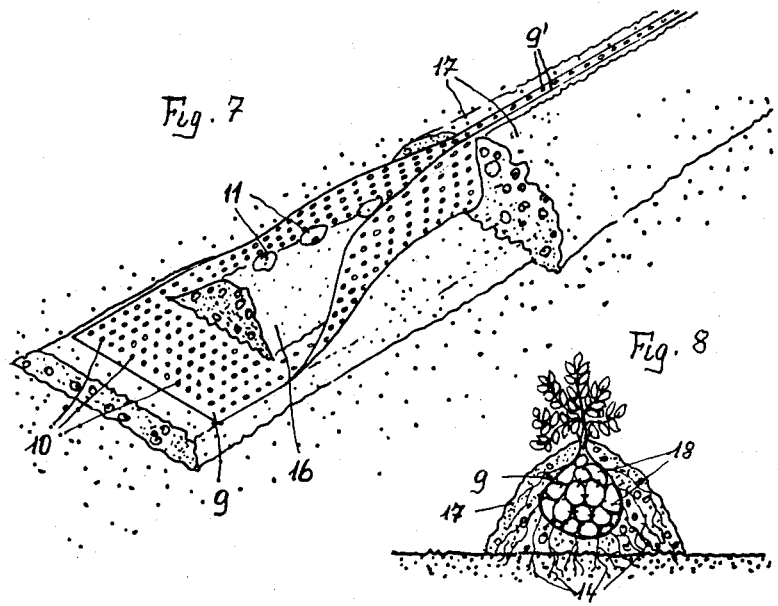
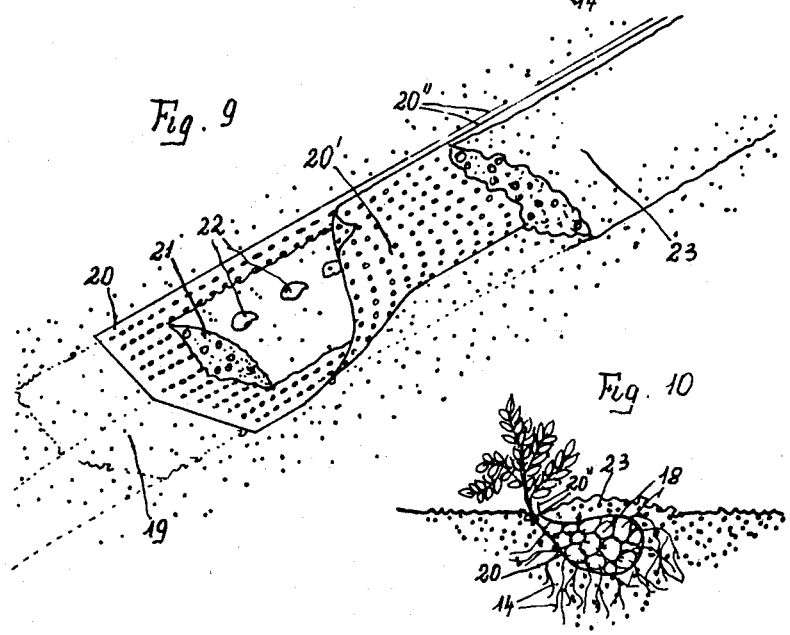

United States Patent Office 2,916,854
Patented Dec. 15, 1959

2,916,854

METHOD OF CULTIVATING PLANTS BY USE OF PERFORATED PLASTIC FOIL

Otto Heigl, Aukofen, Mangolding, and Günther Scharnagl, Regensburg, Germany

Application August 27, 1957, Serial No. 680,498

7 Claims. (Cl. 47—58)

The invention relates to a method for influencing the growth or expanding of those parts of a plant which grow subterraneously in the earth. The present application is a continuation-in-part of our co-pending application Serial No. 578,769, filed April 17, 1956, now Patent No. 2,902,795, granted September 8, 1959.

It is known that when the land to be planted has a proportionally thin fertile soil trees and shrubbery are planted higher into the earth in a so-called hill-planting manner so that their roots which grow slantwise downward can root in this fertile soil. In order to harvest the entire root of a horse-radish a package of ballast is laid into the earth at a predetermined depth, which cannot be shifted, and the tap root is forced to root and ramify sideways.

According to the invention there is laid in the soil thin flat material such as disks, sheets, foils or the like, preferably produced of plastic, and possibly perforated, to influence the growth of the subterraneous parts of a plant. As soon as these subterraneous parts of the plant come against such a layer of material they are forced to grow sideways into the soil provided for them. This is a very convenient way to determine the direction of growth of the subterraneous parts of a plant with regard to the soil conditions. In order not to prevent the rising of water to the roots when such a layer of material is in the earth this material is advantageously provided with small holes or has a form of a grid. This makes it possible, even in a ground with a shallow covering of humus, to plant fruit trees and shrubbery of all kinds with great success. Horse-radish or other long useful tap roots are forced to form branches. The inserting of those layers of material can be done with simple and cheap means and they can be removed at any time.

This method, moreover, makes it possible to set the plants into the earth at the same depth so that they grow uniformly. Asparagus, for example, can advantageously be forced to root not too deeply by means of foils laid underneath, and its thickness can be regulated by foils interposed provided with holes of equal size through which the stems grow so that they become of uniformly thick diameter.

The invention can be advantageously used for planting and harvesting of potatoes. When the potatoes are laid in the earth at the distance required on pieces or ribbons of plastic foil the new tubers grow on these plastic parts or ribbons, whereas the roots can grow downwards through the perforations of the foil. The potatoes which lie on the plastic foil can easily be harvested which, when continuous ribbons are used, can be conveniently effected mechanically.

Instead of solid plates or foils of plastic, with or without perforations, capillary foamed plastic can be used which simultaneously attends to the holding and guiding of water for or to the roots. As the roots come against this plastic plate they are continuously in touch with it, and as this plate is of a capillary nature it always retains moisture which can be sucked in by the roots. These inserted plastic parts, being exchangeable, have the great advantage that they cannot rot.

Referring to the drawings:

Figs. 3, 5, 7, 9 show in perspective view the planting of potato rows stepwise with a plastic layer inserted into the soil.

Figs. 4, 6, 8, 10 show in section through a potato row the growth of one potato plant with a plastic layer laid in the soil.

Figure 1:
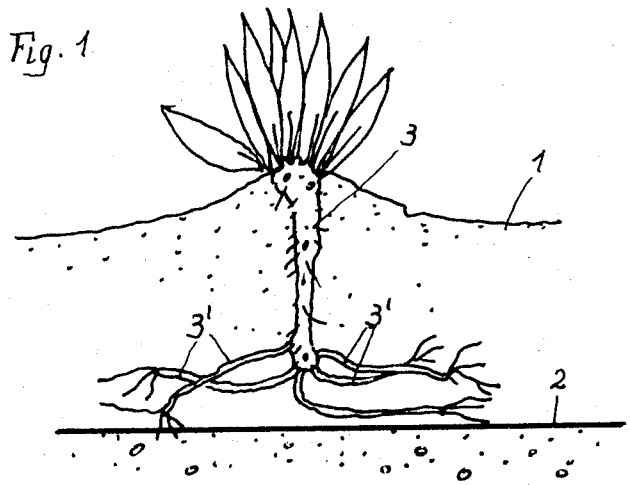
Fig. 1 shows the growth of a horse-radish with a plastic layer laid in the soil.

Fig. 1 shows a solid layer of material 2 preferably made of plastic foil and laid in the soil 1 at a predetermined depth which prevents the horse-radish 3 from rooting underneath the foil. As soon as the root 3 of the horse-radish has reached the foil 2 it ramifies in branches 3' growing above the foil 2 so that the horse-radish can easily be pulled out of the earth with all its roots. The layer of material 2 is preferably made of a perforated or not perforated plate or foil of plastic.

Figure 2:
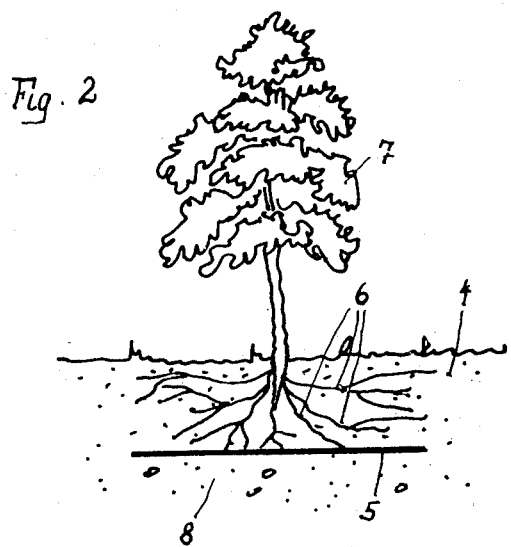
Fig. 2 shows the growth of the roots of a tree with a plastic layer inserted into the soil.

As shown in Fig. 2 the layer of material 5 consisting of a plate or plastic foil and laid in the soil 4 defines the depth to which the roots 6 of the tree 7 are predetermined to root. This depth is adapted to the soil conditions and to the effect desired. If, for example, there is a barren soil 8 beneath the fertile soil 4 the layer of material 5 prevents the roots 6 from growing into this barren soil and forces them to root sideways into the fertile soil 4. A flat, slanting or curved insertion of the layer of material 5 allows to define exactly the direction of the growth of the roots 6.

Fig. 3 shows a ribbon or strip 9 of plastic foil provided with holes or thin perforations and laid on the flat ground. The seed potatoes 11 are now spaced on the ribbon or strip 9 at the required distances and a hill 12 of sieved earth is then piled up on them. Fig. 4 shows the new tubers 13 of a potato plant, grown from each seed potato, in the hill 12 above the foil 9. The thin feeding roots only can grow through the fine holes or perforations 10 of the foil into the soil underneath.

Fig. 5 additionally shows sieved earth 15 between the plain field surface and the foil 9 into and through which the thin feeding roots 14 can grow and root.

In Fig. 7 a small hill 16 of sieved earth is piled up on the foil 9 on which the seed potatoes are spaced at the required distances. The foil is then folded from both sides upward and earth 17 is piled up from either side against so that the two edge portions of the foil 9 possibly project a little from the hill. Fig. 8 demonstrates that the new tubers 18 of each potato plant remain in the folded foil and press it sideways when growing and expanding, whereas the thin feeding roots 14 grow outward through the fine holes or perforations 10 of the foil.

In Fig. 9 a small trench or furrow 19 is opened in the ground in which the foil is laid. A hill 21 of sieved earth is piled up on the foil 20 and seed potatoes 22 spaced on it at required distances. The projecting edge portion 20' of the foil is then pulled to the opposite side over the hill 21 covering it with the seed potatoes 22. Earth 23 is piled up on it leaving the two edge portions 20" of the foil 20 visible. This forces the potato plant to grow sideways through the mouth of the foil formed by the two edge portions 20", as demonstrated in Fig. 10. This potato planting is a flat cultivation and not a hill cultivation.

The various potato rows are set in the field at the required distances in the manner already known. Harvesting of the potato crop can be effected by pulling the foil ribbon 9, 20 out of the soil mechanically which, simultaneously sieves the earth, removes the adhering soil from the potatoes and gathers them.

We claim:

1. A method of cultivating plants comprising exchangeably laying perforated plastic foil in the soil at least under the subterraneously growing parts of a plant in order to influence the growth of said parts in the soil.

2. A method as in claim 1; wherein said plastic foil is in the form of an elongated strip.

3. A method of cultivating potatoes comprising planting spaced apart seed potatoes in a hill of sieved earth with a strip of plastic foil having fine perforations being disposed at least under the seed potatoes to influence the growth of the latter in the earth.

4. A method of cultivating potatoes as in claim 3; wherein said strip of plastic foil is laid on the ground and said seed potatoes are placed on said strip, whereupon said hill of sieved earth is piled upon said seed potatoes on the strip.

5. A method of cultivating potatoes as in claim 3; wherein a layer of sieved earth is laid on the ground and said strip of plastic foil is placed on said layer prior to the disposal of the spaced apart seed potatoes on said strip, whereupon said hill of sieved earth is piled upon said seed potatoes on the strip.

6. A method of cultivating potatoes as in claim 3; wherein a layer of sieved earth is laid on the ground and said strip of plastic foil is placed on said layer, whereupon said hill of sieved earth is formed by piling sieved earth on said strip with the edge portions of the latter projecting from the piled earth, said seed potatoes are placed on the piled earth, the projecting edge portions of said strip are folded upwardly and earth is piled against the upwardly folded edge portions of the strip.

7. A method of cultivating potatoes as in claim 3; wherein a furrow is opened in the ground and said strip of plastic foil is laid in said furrow, whereupon said hill of sieved earth is piled on said strip and the spaced apart seed potatoes are placed on top of said hill, one edge portion of said strip being pulled over said hill with the seed potatoes on the latter and sieved earth being then piled upon the pulled over edge portion.

References Cited in the file of this patent

UNITED STATES PATENTS

| 741,833 | Risien | Oct. 20, 1903 |
| 1,803,838 | Carpenter | May 5, 1931 |
| 2,023,270 | Fischer | Dec. 3, 1935 |
| 2,030,267 | Pratt | Feb. 11, 1936 |
| 2,158,952 | Timberlake | May 16, 1939 |
| 2,605,589 | Kuestner | Aug. 5, 1952 |

FOREIGN PATENTS

| 828,843 | Germany | Jan. 21, 1952 |